United States Patent
Sugiura

(10) Patent No.: US 6,804,973 B2
(45) Date of Patent: Oct. 19, 2004

(54) VEHICLE AIR CONDITIONER WITH FRONT AND REAR AIR-CONDITIONING UNITS

(75) Inventor: Katsumi Sugiura, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/637,394

(22) Filed: Aug. 8, 2003

(65) Prior Publication Data

US 2004/0031602 A1 Feb. 19, 2004

(30) Foreign Application Priority Data

Aug. 9, 2002 (JP) ......................................... 2002-232516

(51) Int. Cl.$^7$ ................................................. B60H 1/32
(52) U.S. Cl. ............................... 62/244; 62/200; 62/231
(58) Field of Search .......................... 62/244, 199, 200, 62/231, 227, 157, 158

(56) References Cited

U.S. PATENT DOCUMENTS

| | | | |
|---|---|---|---|
| 4,426,852 A | | 1/1984 | Nishimura et al. |
| 4,473,109 A | * | 9/1984 | Kojima et al. ............... 165/203 |
| 4,611,374 A | * | 9/1986 | Schnelle et al. .......... 29/890.13 |
| 4,763,564 A | * | 8/1988 | Czarnecki et al. ............. 454/75 |
| 5,904,052 A | * | 5/1999 | Inoue et al. .................... 62/244 |
| 5,975,191 A | * | 11/1999 | Ohashi et al. ................. 165/43 |
| 6,131,652 A | * | 10/2000 | Ito et al. ....................... 165/204 |
| 6,152,217 A | * | 11/2000 | Ito et al. ....................... 165/202 |
| 6,266,967 B1 | * | 7/2001 | Honda .......................... 62/193 |
| 6,311,763 B1 | | 11/2001 | Uemura et al. |
| 6,318,116 B1 | * | 11/2001 | Gabel et al. ................... 62/475 |
| 6,397,942 B1 | * | 6/2002 | Ito et al. ....................... 165/203 |
| 6,430,945 B1 | * | 8/2002 | Haussmann ................... 62/117 |
| 6,491,578 B2 | * | 12/2002 | Yoshinori et al. ........... 454/139 |

FOREIGN PATENT DOCUMENTS

| | | | |
|---|---|---|---|
| EP | 0913283 A1 | * | 5/1999 |
| GB | 2354318 A | * | 3/2001 |
| JP | 408310219 A | * | 11/1996 |
| JP | 409030241 A | * | 2/1997 |
| JP | 2000-6635 | | 1/2000 |
| JP | 02000272323 A | * | 10/2000 |
| JP | 02001253227 | * | 9/2001 |
| JP | 2002-36847 | | 2/2002 |

* cited by examiner

Primary Examiner—William E. Tapolcai
Assistant Examiner—Mohammad M. Ali
(74) Attorney, Agent, or Firm—Harness, Dickey & Pierce, PLC

(57) ABSTRACT

In a vehicle air conditioner including a front automatic air-conditioning unit and a rear manual air-conditioning unit, an air-conditioning control unit changes a correction value of a target air temperature to be blown into a front seat area of a passenger compartment based on an outside air temperature detected by an outside temperature sensor when the rear manual air-conditioning unit operates. Specifically, in a low outside air temperature, the target air temperature for the front seat area is decreased by changing the correction value at a minus side. Accordingly, even a rear heater of the rear manual air-conditioning unit is operated during operation of the front air-conditioning unit, an air temperature blown toward the front seat area in the passenger compartment can be controlled to a set temperature.

11 Claims, 2 Drawing Sheets

VEHICLE AIR CONDITIONER WITH FRONT AND REAR AIR-CONDITIONING UNITS

CROSS-REFERENCE TO RELATED APPLICATION

This application is related to and claims priority from Japanese Patent Application No. 2002-232516 filed on Aug. 9, 2002, the content of which is hereby incorporated by reference.

BACKGROUND OF THE INVENTION

1. Field of the Invention

The present invention relates to a vehicle air conditioner with front and rear air-conditioning units. Generally, the front air-conditioning unit is automatically operated, and the rear air-conditioning unit is manually operated.

2. Description of Related Art

A dual air conditioner for a vehicle is constructed with a front automatic air-conditioning unit and a rear manual air-conditioning unit. The front automatic air-conditioning unit automatically controls an air temperature in a front air-conditioning area (front seat area) of a passenger compartment to a front set temperature by heating and cooling air. The rear manual air-conditioning unit controls an air temperature in a rear air-conditioning area (rear seat area) of the passenger compartment to a rear set temperature that is manually set by a passenger on a rear seat in the passenger compartment. However, in the dual air conditioner, when a rear warm-air outlet is provided adjacent to the front seat area of a front center console, the following problem is caused. For example, in a case where a comfortable air-conditioning state is maintained by the front automatic air-conditioning unit in the front air-conditioning area, if a rear heater of the rear manual air-conditioning unit is operated, warm air from the rear warm-air outlet flows into the front air-conditioning area. Therefore, the comfortable air-conditioning state of the front air-conditioning area of the passenger compartment cannot be maintained. Further, the air temperature in the front air-conditioning area is controlled by the front automatic air-conditioning unit based on the temperature detected by a front temperature sensor, so that the front air-conditioning area is maintained at the front set temperature comfortable for the passenger on the front seat. However, when the front temperature sensor is disposed in an instrument panel portion, a temperature change due to the rear manual air-conditioning unit cannot be rapidly detected by the front temperature sensor. In this case, the air-conditioning feeling given to the passenger on the front seat is worsened.

SUMMARY OF THE INVENTION

It is an object of the present invention to provide a vehicle air conditioner capable of controlling an air temperature in a front seat area of a passenger compartment to a set temperature when a rear air-conditioning unit is operated during operation of a front air-conditioning unit.

According to the present invention, a vehicle air conditioner includes a front air-conditioning unit and a rear air-conditioning unit. The front air-conditioning unit includes a front air-conditioning case having an air introduction port for introducing air outside a passenger compartment and air inside the passenger compartment and an air outlet from which air is blown toward a front seat area of the passenger compartment, a front blower for blowing air introduced from the air introduction port, a front heater for heating air blown from the front blower, a front adjustment unit for adjusting an air heating amount by the front heater, a detecting unit for detecting an environment condition including at least an inside temperature of the passenger compartment and an outside temperature of air outside the passenger compartment, a temperature setting unit for setting a set temperature in the passenger compartment, and a control unit for determining a target air temperature blown toward the front seat area based on the set temperature and the environment condition detected by the detecting unit, and for determining at least one of an air blowing capacity of the front blower and an adjustment amount of the front adjustment unit based on the target air temperature. On the other hand, the rear air-conditioning unit includes a rear blower for introducing and blowing air inside the passenger compartment, a rear heater for heating air blown by the rear blower, a rear setting unit for manually setting one of a blowing capacity of the rear blower and a heating capacity of the rear heater. In the vehicle air conditioner, the control unit decreases the target air temperature in accordance with a decrease of the outside temperature detected by the detecting unit, when the outside temperature is lower than a predetermined temperature. Accordingly, when the rear heater of the rear air-conditioning unit operates while the front air-conditioning unit operates, the automatic control of the front air-conditioning unit is difficult to be affected by the operation of the rear heater. Therefore, the automatic control of the front air-conditioning unit can be accurately performed. Generally, the control unit corrects the target air temperature by a correction value so that the target air temperature becomes lower as one of the blowing capacity and the heating capacity set by the rear setting unit increases, and determines at least one of the blowing capacity of the front blower and the adjustment amount of the front adjustment unit based on the corrected target air temperature. In this case, the front blower and the adjustment amount of the front adjustment unit can be accurately controlled in accordance with the corrected target air temperature. Therefore, the thermal feeling given to the passenger on a front seat in the passenger compartment can be effectively improved.

Specifically, in a low outside air temperature lower than the predetermined temperature, the target air temperature for the front air-conditioning unit is controlled to be reduced by changing the correction value at a minus side. Therefore, even if the rear heater of the rear air-conditioning unit is operated, the air temperature to be blown toward the front seat area of the passenger compartment can be controlled at the set temperature.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the appended drawings.

Figure 1:
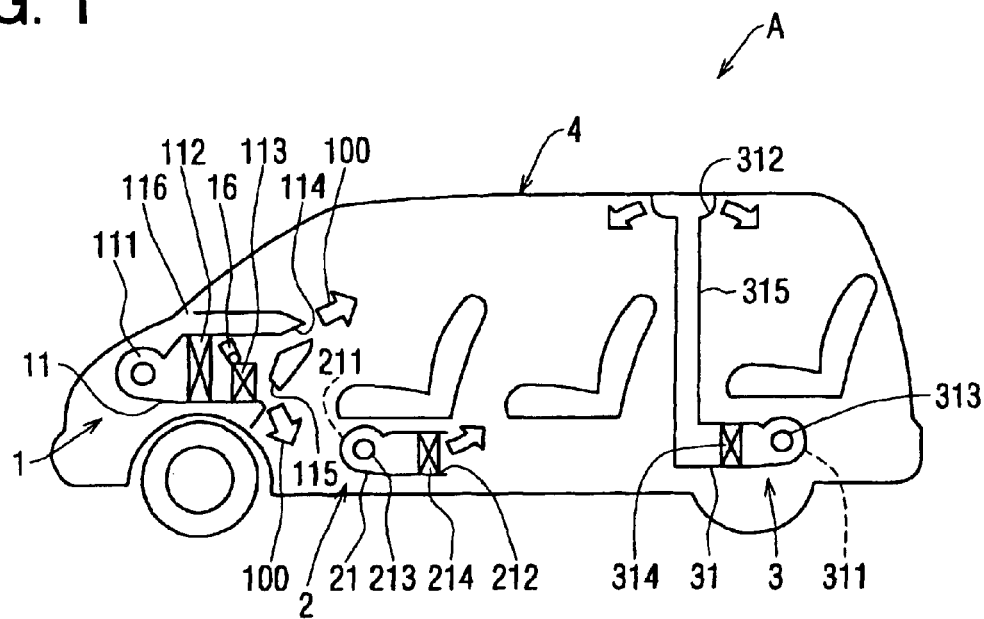
FIG. 1 is a schematic diagram showing a vehicle air conditioner with a front air-conditioning unit and a rear air-conditioning unit according to a preferred embodiment of the present invention.
Figure 2:
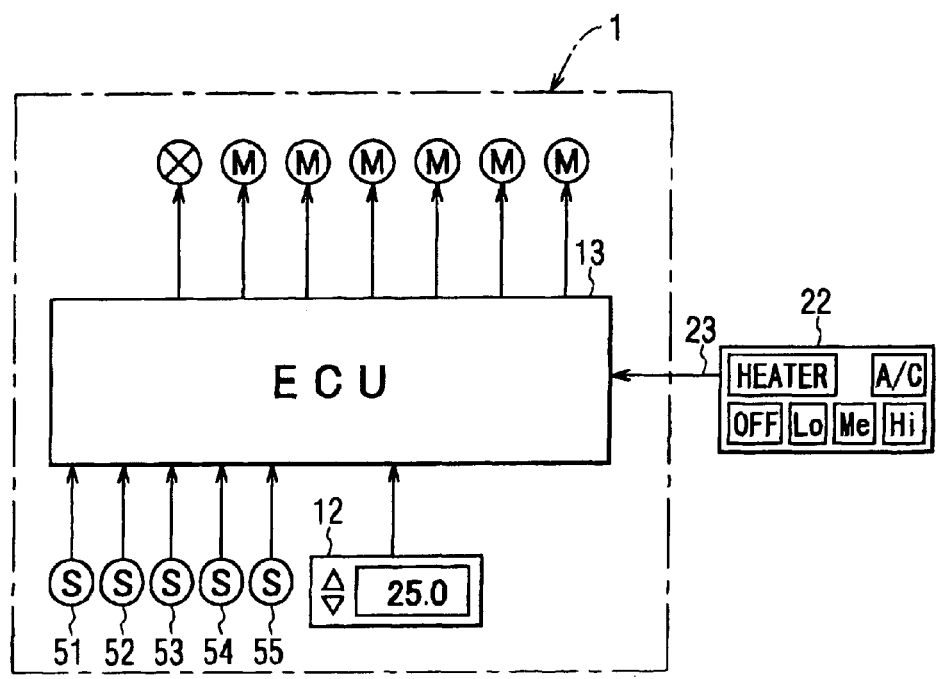
FIG. 2 is a block diagram showing a control system of the vehicle air conditioner shown in FIG. 1.

In the preferred embodiment, as shown in FIG. 1, a vehicle air conditioner (dual air conditioner) A includes a front air-conditioning unit 1 that is automatically operated, a rear manual heating unit 2 and a rear manual cooling unit 3. A rear air-conditioning unit is constructed with the rear manual heating unit 2 and the rear manual cooling unit 3. A refrigerant cycle of the front air-conditioning unit 1 includes a refrigerant compressor for compressing refrigerant, a refrigerant condenser for cooling and condensing refrigerant, a receiver, a decompression device, and an evaporator 112 for evaporating refrigerant. The components of the refrigerant cycle are connected by refrigerant piping so as to form a closed cycle. Specifically, the refrigerant compressor is driven by a vehicle engine through a solenoid clutch. The refrigerant condenser cools and condenses refrigerant discharged from the refrigerant compressor by air blown by a cooling fan. The receiver temporarily stores refrigerant from the refrigerant condenser, and supplies only liquid refrigerant to the decompression device. Liquid refrigerant from the receiver flows into the evaporator 112 after being decompressed in the decompression device. The refrigerant having a low temperature and low pressure, decompressed by the decompression device, is evaporated in the evaporator 112 by receiving heat from air blown by a front blower 111. Therefore, air passing through the evaporator 112 is cooled.

The front air-conditioning unit 1 includes a front air conditioning case 11 for defining an air passage, a temperature setting unit 12, plural sensors 51–55 and an air-conditioning control unit (ECU) 13. As shown in FIG. 1, in the front air-conditioning case 11, there is provided with the blower 111, the evaporator 112, a heater core 113 and an air mixing door 16. The front air-conditioning case 11 has an air introduction port (not shown) and air outlets 114–116. The air introduction port is provided in the air conditioning case 11 within a dashboard of a one box car 4, so that inside air (i.e., air inside a passenger compartment) or/and outside air (i.e., air outside the passenger compartment) is selectively introduced from the air introduction port. The blower 111 sucks air from the air introduction port, and blows the sucked air toward downstream. Air blown by the blower is cooled by the evaporator 112 and is heated by the heater core 113. The heater core 113 is disposed within the air conditioning case 11 downstream from the evaporator 112 in an air flow direction. A bypass passage through which air after passing through the evaporator 112 flows while bypassing the heater core 113 is provided. A flow ratio between air passing through the heater core 113 and air passing through the bypass passage is adjusted by an air mixing door 16 disposed at an upstream air side of the heater core 113. Air from the heater core 113 and air from the bypass passage are mixed so that conditioned air having a predetermined temperature can be obtained. The conditioned air is blown to the front seat area in the passenger compartment through the air outlets 114–116 as shown by arrows 100 in FIG. 1.

The blower 111 includes a centrifugal fan disposed in a centrifugal blower case, and a blower motor for driving the centrifugal fan. The centrifugal fan is rotated at a rotational speed corresponding to a voltage (e.g., 4–12 V) applied to the blower motor. The heater core 113 heats air flowing in the front air-conditioning case 11 by using engine-cooling water as a heat source. A hot water circuit is constructed with the heater core 113, a cooling water circuit (not shown) of the vehicle engine and hot water piping for connecting them.

The temperature setting unit 12 is disposed on the dashboard so as to be operated by the passenger on the front seat. Therefore, the temperature in the passenger compartment can be set by operating the temperature setting unit 12. The plural sensors includes an inside temperature sensor 51, an outside temperature sensor 52, a solar radiation sensor 53, a post-evaporator temperature sensor 54 and a water temperature sensor 55. The inside temperature sensor 51 is disposed at a predetermined position of the dashboard, and detects an air temperature (i.e., inside air temperature Tr) at a front seat side in the passenger compartment. The outside temperature sensor 52 detects an air temperature (i.e., outside air temperature Tam) outside the passenger compartment. The solar radiation sensor 53 detects a solar radiation amount Ts entering the passenger compartment, and the post-evaporator temperature sensor 54 detects a temperature (post-evaporator temperature Te) of air directly after passing through the evaporator 112. A water temperature sensor 55 detects a temperature (water temperature Tw) of engine cooling water.

The ECU 13 calculates a target air temperature TAO to be blown to the front seat area of the passenger compartment by using the following formula (1) based on detected values of the plural sensors 51–55 and a target set temperature Tset in the passenger compartment set by the temperature setting unit 12.

$$TAO = Kset \times Tset - Kr \times Tr - Kam \times Tam - Ks \times Ts + C \quad (1)$$

wherein, Kset, Kr, Kam, Ks are gain values, Tset is the set temperature, and Tr, Tam and Ts are detected values by the sensors.

The rear manual heating unit 2 (rear air-conditioning unit) is constructed with a warm air blowing unit 21 and a capacity setting unit 22. The warm-air blowing unit 21 includes an inside air introduction port 211 from which inside air is introduced, a warm air blower (rear blower) 213 for blowing the introduced inside air, a rear heater core 214 and a warm air outlet (rear air outlet) 212. The warm-air blowing unit 21 is disposed below a front passenger seat at the first line from the front. Inside air in the passenger compartment is introduced from the inside air introduction port 211 in the warm-air blowing unit 21. The warm air blower 213 blows the sucked inside air toward downstream. The heater core 214 heats air blown from the warm air blower 211, and the heated air from the heater core 214 is blown toward the rear seat area in the passenger compartment through the rear warm air outlet 212.

The rear manual cooling unit 3 is constructed with a cool-air blowing unit (rear air-conditioning unit) 31, and the capacity setting unit 22. The cool-air blowing unit 31 includes an inside air introduction port 311, a cool air blower (rear blower) 313, an evaporator 314 and a cool air outlet 312 (rear air outlet). The cool-air blowing unit 31 is disposed below a passenger seat at the rearmost line in the passenger compartment. Inside air inside the passenger compartment is introduced from the inside air introduction port 311. The cool air blower 313 blows the introduced inside air toward downstream in the cool-air blowing unit 31. The evaporator 314 cools the blown air, and the cooled air is blown from the cool air outlet 312 toward the rear seat area in the passenger compartment. In this embodiment, the capacity setting unit 22 includes a heating-capacity setting member for manually setting a heating capacity of the rear heater core 214, a cooling-capacity setting member for manually setting a cooling capacity of the rear evaporator 314 and a blowing amount setting member for setting an air-blowing level (Lo, Me, Hi) of the rear blower 213, 313.

The rear evaporator 314 is also provided in the same refrigerant cycle as to that of the front evaporator 112 of the front air-conditioning case 11. Each of the blowers 213, 313 includes a centrifugal fan and a blower motor for driving the centrifugal fan. Further, each of the blowers 213, 313 is rotated at a rotational speed by a voltage (e.g., 4–12 V), applied to the blower motor, corresponding to the blowing level (Lo, Me, Hi) of warm air or cool air set by the passenger on the rear seat. Cool air from the rear evaporator 314 passes through an air duct 315 disposed between a vehicle interior face and a vehicle body, and is blown downward from a vehicle ceiling to the rear seat side. Further, in the embodiment, the heating-capacity setting member, the cooling-capacity setting member and the blowing amount setting member are integrated with each other in the capacity setting unit 22. The passenger on the rear seat selects one of the cooling operation and the heating operation, and one of the air-blowing levels Lo, Me, Hi and OFF. Generally, the capacity setting unit 22 is disposed on a rear face of the front center console disposed between a driver seat and a front passenger seat next to the driver seat. The heating-cooling operation signal and the blowing level signal set by the capacity setting unit 22 are input to the ECU 13 through a connection wire 23.

Figure 3:
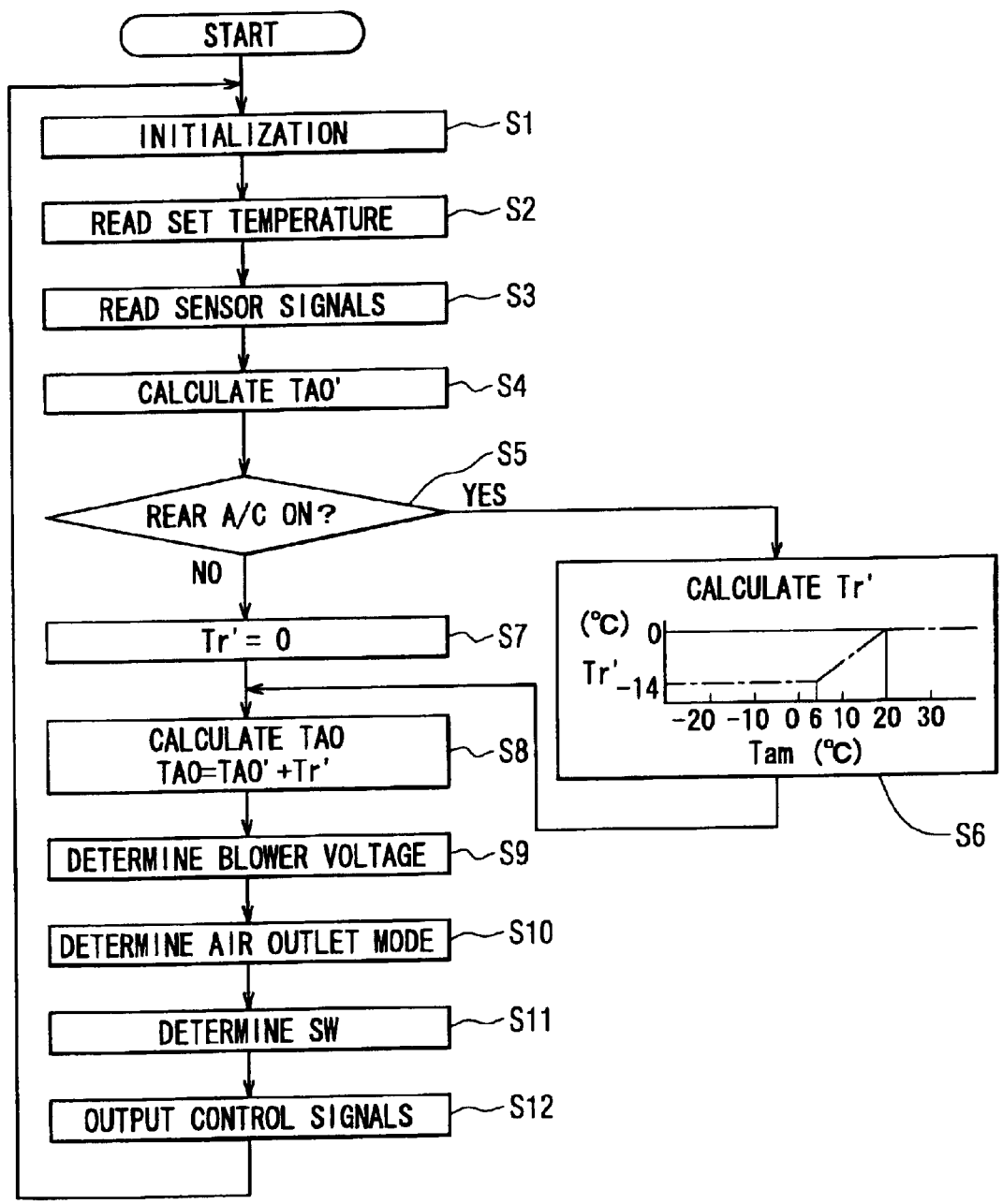
FIG. 3 is a flow diagram showing a control process of the vehicle air conditioner according to the embodiment.

Next, a control operation of an ECU 13 will be described with reference to FIG. 3. When an air-conditioning switch (A/C switch) of the front automatic air-conditioning unit 1 is turned on, electric power is supplied to the ECU 13, and the ECU 13 is initialized at step S1. Then, the ECU 13 reads a set temperature sending from the temperature setting unit 12 at step S2, and reads the sensor signals from the plural sensors 51–55 at step S3. At step S4, the ECU 13 calculates a temporary target air temperature TAO' by using the following formula (2) based on the detected values of the plural sensors 51–55 and the set temperature of the passenger compartment set by the temperature setting unit 12.

$$TAO'=Kset \times Tset - Kr \times Tr - Kam \times Tam - Ks \times Ts + C \tag{2}$$

wherein, Kset, Kr, Kam, Ks are gain values, Tset is the set temperature set by the temperature setting unit 12, and Tr, Tam, Ts are detected values by the sensors.

When at least one of the rear air-conditioning units 2, 3 (rear A/C) is turned on, that is, when the determination at step S5 is YES, the control program proceeds to step S6. When both of the rear air-conditioning units 2, 3 are turned off, that is, when the determination at step S6 is NO, a correction value Tr' of the target air temperature TAO is set at 0° C. at step S7. In this embodiment, the correction of the target air temperature TAO is performed when at least one of the rear air-conditioning units 2, 3 is operated. In the example of FIG. 3, the correction of the target air temperature TAO is performed when the rear manual heating unit 2 is operated.

At step S6, the correction value Tr' of the target air temperature TAO is calculated based on a relationship between the outside air temperature Tam and the correction value Tr' (correction temperature) beforehand stored in a ROM of the ECU 13. In the embodiment, as shown by the graph at step S6 in FIG. 3, the correction value Tr' is set at 0° C. in a high outside temperature area equal to or higher than 20° C., and the correction value Tr' is set at −14° C. in a low outside temperature area equal to or lower than 6° C. In an intermediate temperature area of the outside air temperature Tam higher than 6° C. and lower than 20° C., as the outside air temperature Tam reduces, a heat radiation amount from the warm air outlet 212 affecting to the temperature feeling of the passenger on the front seat gradually larger. Therefore, in the intermediate temperature area, as the outside air temperature Tam reduces, the correction value Tr' is gradually changed from 0° C. to −14° C.

At step S8, the corrected target air temperature TAO is calculated by using the following formula (3).

$$TAO=TAO'+Tr' \tag{3}$$

At step S9, the voltage applied to the blower 111 is determined based on a relationship (not shown) between the corrected target air temperature TAO and the voltage applied to the blower 111. At step S10, an air outlet mode, corresponding to the calculated target air temperature TAO, is determined based on a relationship (not shown) between the target air temperature TAO and the air outlet mode. At step S11, a target open degree SW of the air mixing door 16 is calculated by using the following formula (4) so that an actual temperature of air to be blown into the passenger compartment becomes the calculated target air temperature TAO.

$$SW=[(TAO-Te)/(Tw-Te)] \times 100(\%) \tag{4}$$

wherein, SW is the target open degree of the air mixing door 16, Te is the post-evaporator temperature, and Tw is the cooling water temperature.

At step S12, an inside-outside air switching door for opening and closing the front inside air introduction port and the front outside air introduction port, the air mixing door 16 and the blower motor are controlled based on the control signals output to motors and motor drive circuits of those components. After a predetermined control period (not shown) passes, the control program returns to step S1.

According to the embodiment of the present invention, the ECU 13 changes the correction value Tr' of the target air temperature TAO of the front air-conditioning unit 1 based on the outside air temperature Tam detected by the outside temperature sensor 52, when at least one of the rear manual heating unit 2 and the rear manual cooling unit 3 operates. This reason is as follows. For example, as the outside air temperature reduces, a heat radiation amount of air from the rear warm-air outlet 212 is increased when the rear manual heating unit 2 operates. Therefore, an air temperature in the front air-conditioning area is increased more rapidly on the rear seat side duo to the warm air blown from the rear warm-air outlets 212, and the temperature feeling given to the passenger on the front seat is changed. Specifically, when the outside air temperature Tam is low, the target air temperature TAO of the front air-conditioning unit 1 is controlled to be decreased by increasing the correction temperature Tr' at a minus side. Therefore, even if the rear manual heating unit 2 is operated, the air temperature at the front seat side in the passenger compartment can be maintained at the set temperature.

According to the present invention, the ECU 13 has a rear operation determining means for determining an operation state of the rear blower 213, 313. Further, when the ECU 13 determines that the rear blower 213 operates, the ECU 13 decreases the target air temperature TAO in accordance with a decrease of the outside temperature when the outside temperature is lower than a predetermined temperature. On the other hand, when the ECU 13 determines that the rear blower 213 stops, the ECU 13 prohibits to correct the target air temperature TAO in accordance with the outside temperature even when the outside temperature is lower than the predetermined temperature. Therefore, even when the rear manual heating unit 2, that is, the rear blower 213 operates, the temperature of air blown toward the front air-conditioning area of the passenger compartment can be accurately automatically controlled in the front air-conditioning unit 1.

Further, the ECU 13 performs the above-described correction of the target air temperature TAO when a warm air blowing mode (e.g., a foot mode or a bi-level mode), where warm air is blown to the rear seat side, is set in the rear air-conditioning units 21, 31. For example, in a high outside air temperature, a cool air blowing mode (face mode) is selected. In this mode, cool air is blown from the cool air outlet 312, but warm air is not blown from the warm air outlet 212. Generally, because the cool air blowing mode in the rear air-conditioning unit does not greatly affect the air temperature at the front seat side, the correction of the target air temperature TAO of the front air-conditioning unit 1 is not required. Therefore, in the above-described embodiment, the target air temperature TAO can be corrected only when the rear manual heating unit 2 operates without relating to the operation of the rear manual cooling unit 3. Further, in this case, the target air temperature TAO is corrected to become lower as one of the air blowing level (blowing capacity) and the heating capacity set by the rear capacity setting unit 22 increases. Therefore, the blowing capacity of the front blower 111, the rotation position of the air mixing door 16 and the like can be adjusted based on the corrected target air temperature. In this embodiment, the air heating amount by the front heater core 113 is adjusted by the air mixing door 16. However, the air heating amount by the front heater core 113 can be adjusted by an adjustment unit for adjusting a flow amount or a temperature of hot water flowing into the front heater core 113.

Although the present invention has been fully described in connection with the preferred embodiments thereof with reference to the accompanying drawings, it is to be noted that various changes and modifications will become apparent to those skilled in the art.

For example, in the above embodiment, the rear air-conditioning unit is divided to the rear manual heating unit 2 and the rear manual cooling unit 3. However, without being limited to this manner, the rear manual heating unit 2 and the rear manual cooling unit 3 may be integrated together to form the rear air-conditioning unit in the present invention. Further, only the rear manual heating unit 2 may be provided as the rear air-conditioning unit.

In the above embodiment, the capacity setting unit 22 is formed so as to change the blowing amount of warm air and the blowing amount of cool air. However, without being limited to this manner, the capacity setting unit 22 may be formed so as to directly increase and reduce a heating capacity of a heater core and a cooling capacity of an evaporator. Further, the capacity setting unit 22 may be formed so as to change both of the cool-warm air blowing amount and the heating-cooling capacity.

Further, in the above-described embodiment, the rear air-conditioning unit can have rear outlet-mode setting means for setting a rear outlet mode among a foot mode for blowing air toward a rear lower side, a face mode for blowing air toward a rear upper side, and a bi-level mode for blowing air toward both the rear lower side and the rear upper side. In this case, when any one of the foot mode and the bi-level mode is set in the rear air-conditioning unit, the ECU 13 corrects the target air temperature based on the outside air temperature Tam. On the other hand, when the face mode is set in the rear air-conditioning unit, the ECU 13 prohibits to correct the target air temperature in accordance with the outside air temperature Tam even when the outside air temperature Tam is lower than the predetermined temperature. In addition, the present invention may be applied to a dual air conditioner having a front automatic air-conditioning unit and a rear automatic air-conditioning unit which are operated automatically.

Such changes and modifications are to be understood as being within the scope of the present invention as defined by the appended claims.

What is claimed is:

1. An air conditioner for a vehicle having a passenger compartment, the air conditioner comprising:
   a front air-conditioning unit including
      a front air-conditioning case for defining a front air passage through which air flows, the front air-conditioning case having an air introduction port for introducing air outside the passenger compartment and air inside the passenger compartment, and an air outlet from which air is blown toward a front seat area of the passenger compartment,
      a front blower for blowing air introduced from the air introduction port,
      a front heater for heating air blown from the front blower,
      a front adjustment unit for adjusting an air heating amount by the front heater,
      a detecting unit for detecting an environment condition including an inside temperature of the passenger compartment and an outside temperature of air outside the passenger compartment,
      a temperature setting unit for setting a set temperature in the passenger compartment, and
      a control unit for determining a target air temperature to be blown toward the front seat area based on the set temperature and the environment condition detected by the detecting unit, and for determining at least one of an air blowing capacity of the front blower and an adjustment amount of the front adjustment unit based on the target air temperature; and
   a rear air-conditioning unit including
      a rear blower for introducing and blowing air inside the passenger compartment,
      a rear heater for heating air blown by the rear blower,
      a rear setting unit for manually setting one of a blowing capacity of the rear blower and a heating capacity of the rear heater, wherein
   the control unit corrects the target air temperature by a correction value so that the target air temperature becomes lower as one of the blowing capacity and the heating capacity set by the rear setting unit increases, and determines at least one of the blowing capacity of the front blower and the adjustment amount of the front adjustment unit based on the corrected target air temperature; and
   the control unit changes the correction value of the target air temperature based on the outside temperature detected by the detecting unit.

2. The air conditioner according to claim 1, wherein:
   the rear air-conditioning unit includes a rear air-conditioning case for defining a rear air passage through which air flows, the rear air-conditioning case having an air introduction port for introducing air inside the passenger compartment, and a rear air outlet from which air is blown toward a rear seat area of the passenger compartment; and
   the rear air outlet of the rear air-conditioning case is provided near the front seat area.

3. The air conditioner according to claim 1, wherein the control unit sets the correction value to zero when the outside temperature is higher than a first predetermined temperature.

4. The air conditioner according to claim 3, wherein the absolute value of the correction value becomes larger as the outside temperature decreases, and becomes maximum when the outside temperature is lower than a second predetermined temperature lower than the first predetermined temperature.

5. The air conditioner according to claim 1, wherein:

the control unit has a rear operation determining means for determining an operation state of the rear blower;

when the control unit determines that the rear blower operates, the control unit decreases the target air temperature in accordance with a decrease of the outside temperature when the outside temperature is lower than a predetermined temperature; and when the control unit determines that the rear blower stops, the control unit prohibits to correct the target air temperature in accordance with the outside temperature even when the outside air temperature is lower than the predetermined temperature.

6. The air conditioner according to claim 1, wherein the front air-conditioning unit further includes a front evaporator, disposed in the front air conditioning case upstream from the front heater, for cooling air.

7. The air conditioner according to claim 6, wherein:

the rear air-conditioning unit further includes a rear evaporator for cooling air to be blown to the rear seat area of the passenger compartment; and the front evaporator and the rear evaporator are constructed with the same refrigerant cycle.

8. The air conditioner according to claim 7, wherein:

the rear air-conditioning unit has rear outlet-mode setting means for setting a rear outlet mode among a foot mode for blowing air toward a rear lower side, a face mode for blowing air toward a rear upper side and a bi-level mode for blowing air toward both the rear lower side and the rear upper side; and when any one of the foot mode and the bi-level mode is set in the rear air-conditioning unit, the control unit corrects the target air temperature.

9. An air conditioner for a vehicle having a passenger compartment, the air conditioner comprising:

a front air-conditioning unit including a front air-conditioning case for defining a front air passage through which air flows, the front air-conditioning case having an air introduction port for introducing air outside the passenger compartment and air inside the passenger compartment, and an air outlet from which air is blown toward a front seat area of the passenger compartment, a front blower for blowing air introduced from the air introduction port, a front heater for heating air blown from the front blower, a front adjustment unit for adjusting an air heating amount by the front heater, a detecting unit for detecting an environment condition including an inside temperature of the passenger compartment and an outside temperature of air outside the passenger compartment, a temperature setting unit for setting a set temperature in the passenger compartment, and a control unit for determining a target air temperature blown toward the front seat area based on the set temperature and the environment condition detected by the detecting unit, and for determining at least one of an air blowing capacity of the front blower and an adjustment amount of the front adjustment unit based on the target air temperature; and a rear air-conditioning unit including a rear blower for introducing and blowing air inside the passenger compartment, a rear heater for heating air blown by the rear blower, a rear setting unit for manually setting a blowing capacity of the rear blower, wherein the control unit decreases the target air temperature in accordance with a decrease of the outside temperature detected by the detecting unit, when the outside temperature is lower than a predetermined temperature.

10. The air conditioner according to claim 9, wherein:

the control unit has rear operation determining means for determining an operation state of the rear blower; and when the control unit determines that the rear blower stops, the control unit prohibits to decrease the target air temperature in accordance with the decrease of the outside temperature even when the outside air temperature is lower than the predetermined temperature.

11. The air conditioner according to claim 9, wherein:

the rear air-conditioning unit further includes a rear evaporator for cooling air to be blown to the rear seat area of the passenger compartment, and rear outlet-mode setting means for setting a rear outlet mode among a foot mode for blowing air toward a rear lower side, a face mode for blowing air toward a rear upper side and a bi-level mode for blowing air toward both the rear lower side and the rear upper side; and when any one of the foot mode and the bi-level mode is set in the rear air-conditioning unit, the control unit corrects the target air temperature.

* * * * *